Patented Nov. 14, 1950

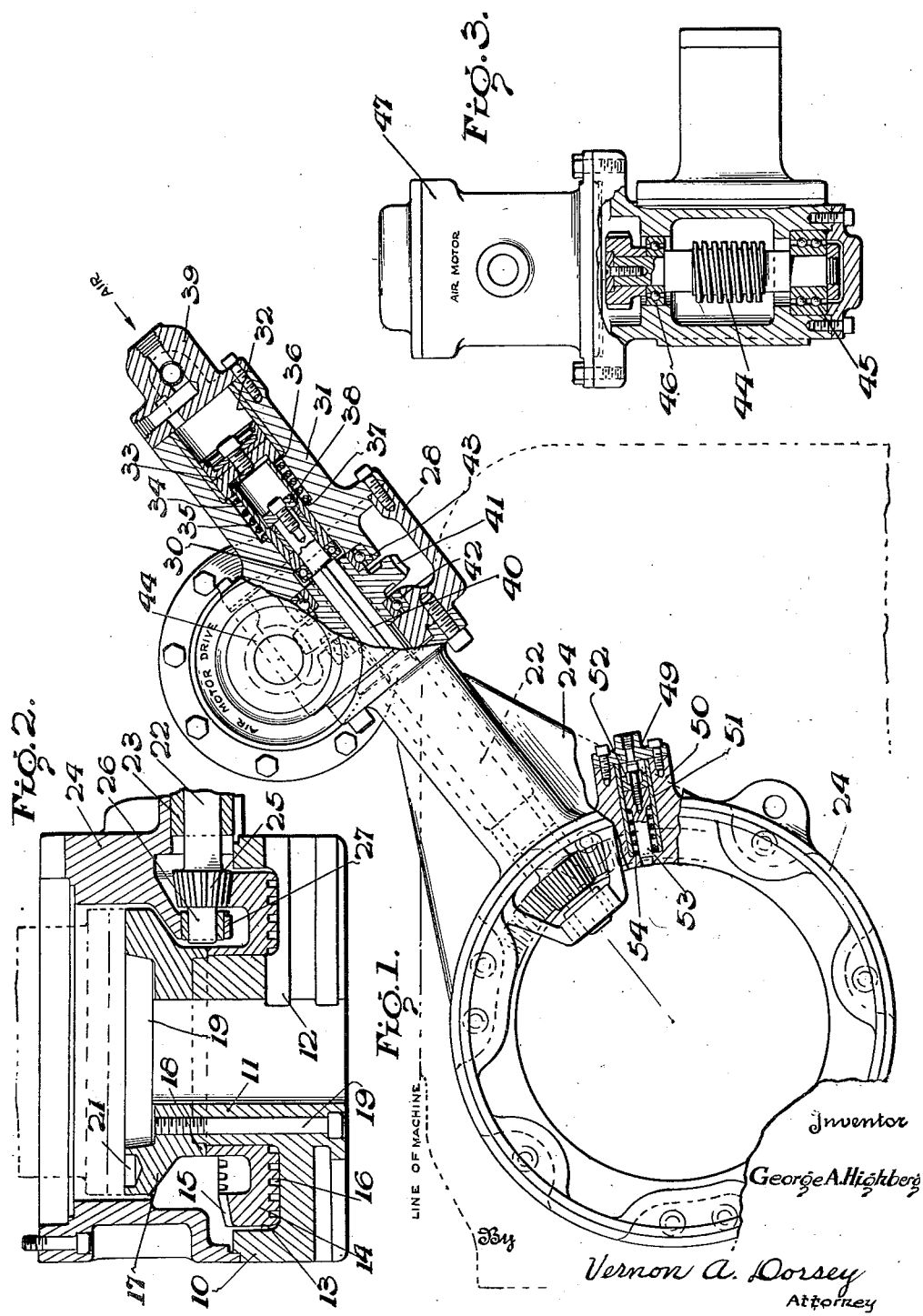

2,529,772

UNITED STATES PATENT OFFICE 2,529,772

CHUCK OPERATING MECHANISM

George A. Highberg, West Hartford, Conn.

Application January 10, 1949, Serial No. 70,022

5 Claims. (Cl. 279—4)

The present invention relates to power chucks for machine tools and more particularly to a power unit combination attachable to the headstock of any standard machine tool for opening and closing a spindle mounted power chuck.

Usually power chucks are opened and closed by wrench operated pinion members turnably mounted in the rotatable chuck body. These pinions are in engagement with a scroll or the like, which transmits radial movement to the chuck jaws. In turn the pinions are formed with wrench receiving sockets, which sockets are exposed through the outer circumference of the chuck body. However, such prior art arrangements require that the chuck body be rotated or turned until one of the wrench sockets is positioned opposite the wrench head. Obviously, this required turning of the chuck body is an undesirable feature as it must be done either manually or by some specially devised automatic mechanisms, which mechanisms make the machines more complicated to manufacture and to operate.

An object of the present invention is to provide a power chuck, wherein it is not necessary for the chuck body to be turned for alignment with the head of a wrench or the like to open and close the same.

Another object is to provide a power operating mechanism for power chucks which is formed with a bracket member as one assembled unit mountable on the headstock of any standard machine tool or the like in operative alignment with the chuck body, which is separately mounted on the machine tool spindle, said mechanism always being in a position readily and automatically projectable into operating connection with the chuck scroll rotatably mounted on the hub of the chuck body.

A further object is to provide a novel compact detachable fluid actuated jaw opening and closing unit for power chucks, whereby there is complete automatic operation of the mechanism both into and out of chuck jaw operating position and whereby the opening and closing of the chuck jaws is likewise entirely automatic.

A further object is to provide an automatic power chuck control unit for simple attachment to machine tool headstocks comprising a fluid driven means for rotating a chuck scroll to transmit radial movement to the chuck jaws, in combination with a fluid projected member adapted to latch the machine tool spindle and the chuck body against rotation, to thereby facilitate radial adjustment of the chuck jaws during rotation of the scroll.

Other objects and advantages of the present invention will appear more fully after reading the following detailed description together with reference to the accompanying drawings wherein one embodiment is illustrated.

The foregoing and other objects are attained by providing a system for distributing power fluid through a four-way operating valve, not shown, to a plurality of fluid drive devices. Broadly, the fluid drive devices of the system are all assembled as a unit on a supporting bracket and include a main piston adapted to transmit forward sliding movement to a spring retracted scroll drive spindle, an air motor with a worm drive shaft connection to the scroll drive spindle and a relatively small auxiliary cylinder, which houses a fluid projected and spring retracted lock pin adapted to hold the machine tool spindle and the chuck body, which is mounted on the machine tool spindle, against turning during rotation of the scroll member to open or close the chuck jaws.

In the drawings:

Figure 1 is a front view partly in elevation and partly in cross section of the chuck opening and closing mechanism, clearly illustrating the bracket and the unitary nature of the mechanism before the chuck is applied to the machine tool spindle.

Figure 2 is a cross section view of a chuck, showing it attached to the nose of a machine tool spindle represented in dotted lines, and a cross section view of the bracket of the jaw opening and closing mechanism in Figure 1, which bracket is to be bolted to the headstock of the machine tool.

Figure 3 is a top elevational view of the air motor housing and a partial cross section of the worm drive connection from the motor.

Referring in detail to the drawings and first with particular reference to Figures 1 and 2, there is illustrated a chuck body 10 comprising a hub 11. The chuck body is slotted to form radial chuck jaw channels and one of the work holding jaws 12 is shown in Figure 2. Opposite to the jaw side of the chuck body 10 is the hub 11, which projects from an annular well 13.

Mounted around the hub 11 partially within the well 13 is an annular scroll member 14 of L-shaped configuration in cross-section. The longer leg of the L-section is journalled to turn on the hub 11, the shorter leg is formed with bevel gear teeth 15 around the end thereof, and the base is formed with spiral splines 16. The splines 16 interleave with similar splines on the top edge of the chuck jaws 12, so that upon rotation of the scroll the jaws are moved radially to or from the center axis of the chuck. The means for rotating the scroll is shown in Fig. 1 and will be described in the following paragraphs. However, first it is important to understand that the chuck body 10 attaches to the machine tool spindle.

The chuck body includes a collar 17 formed with a counter-sunk end, to thereby define an annular flange 18. This arrangement provides for reception of the tip end of the hub 11 and the annular flange 18 serves as an abutment for the tip end of the longer leg portion of the scroll. The collar 17 is combined with the chuck body 11 in a convenient manner, such as for example by the elongated bolts 19. Thus lateral displacement of the annular scroll 14 is prevented.

The collar 17 is machined to conform and fit over the end of a machine tool spindle 20, see Fig. 2, and includes any suitable type fastener means 21 for securing the chuck body to the machine tool spindle 20.

The present invention power unit, shown in assembled form in Fig. 1, is made to operatively cooperate with the chuck body 11 and to properly locate a scroll actuator spindle 22 mounted for both rotary and endwise movement laterally with respect to the chuck in a guide sleeve 23 formed from an annular bracket or support 24. The spindle 22 is formed with a bevel gear 25 and a bearing nipple 26 turnably mounted in a bearing 27 formed from the bracket 24. The other end of the scroll spindle 22 extends beyond the opposite end of the sleeve 23 through a gear housing 28 and bearing 30 mounted in the bottom wall or lower end of an air cylinder 31.

The lower end of the air cylinder serves as the top wall of the gear housing 28. The upper portion of the air cylinder is lined with a sleeve 32 and houses a piston 33 connected to the end of the scroll spindle. This piston has a reduced hollow shank 34 around which is coiled a spring 35. The spring 35 is caged between opposite shoulders or lands 36 and 37, respectively. The land 36 is formed at the under side of the piston 33 by the reduced shank portion and the land 37 is formed from the lower portion of the air cylinder, as shown in Fig. 1.

The upper end of the scroll spindle has mounted thereon a packing disk 38, which reciprocates in the hollow shank 34 of the piston 33 so as to allow an elongated space for the action of the spring 35 when compressed by fluid pressure supplied through the intake port in the end cap 39 of the cylinder 31.

In the gear housing 28 the scroll spindle 22 is formed with elongated axial splines 40. These splines interfit with grooves in the bore of a worm gear 41 held in one place for rotation in bearings 42 and 43. Thus the worm gear 41 is permitted to rotate the scroll spindle and the piston 33 is permitted to move the spindle endwise by reason of the splines 40 sliding in the grooves of the worm gear 41.

In mesh with the worm gear 41 is a worm drive shaft 44, best shown in Figure 3. The worm shaft 44 is rotatably mounted in bearings 45 and 46 in the gear housing 28 and extends through a side wall of the housing to a rotary type fluid motor 47. Motor 47 connects to a suitable source of fluid power supply through a four-way valve, not shown. This valve likewise controls the supply of power fluid to the air cylinder 31, and to the apertured end cap 49 of a relatively smaller auxiliary cylinder 50 mounted on the bracket 24 in close proximity to the bevel gear end of the scroll spindle 24.

The auxiliary cylinder 50 contains a lining sleeve 51 and reciprocatable in the sleeve bore is a piston 52 formed as the headed portion of a lock pin 53. Around the pin shank is a coiled spring 54, which has one end coil abutting under the piston 52 and the other or opposite end coil abutting the bottom of the auxiliary cylinder 50.

When the lock pin 53 is projected forwardly by fluid pressure, the end thereof engages into a detent, not shown, formed in the machine tool spindle 20. Then when the pressure on the piston 52 is released the spring 54 having been compressed has stored up sufficient energy to retract the pin and release the spindle 20.

*Operation*

The operation of the present invention chuck jaw power unit is under control of a four-way operating valve, not shown. The body of this valve connects by fluid conveying conduits, not shown, to a common source of fluid power on its intake side and through series connecting power device conduits, not shown, to the cylinder cap 39, cylinder 47 and auxiliary cylinder cap 49 of the several power devices supported as an assembled unit on the bracket 24.

The operator moves the handle of the above-mentioned four-way valve which allows fluid, such as air, to enter the piston cylinder 31. This moves the scroll spindle 22 and bevel pinion 25 into mesh with the scroll gear 15 and at the same time fluid enters the air motor cylinder 47, to thereby drive worm gear 41 and rotate the pinion 25 through the splines 40. This causes the scroll to turn and adjust the chuck jaws 12 into work-gripping position.

Also, simultaneously with the actuation of the spindle driving fluid means, the lock pin 53 is projected into engagement with the machine tool spindle to hold the said spindle 20 and chuck body 10 fixed until the chuck jaws have gripped the work.

When the work is gripped the valve operator turns the valve handle, not shown, to neutral position and the spring 35 retracts the pinion 25 and scroll spindle 22. This then leaves the chuck and spindle free to rotate, as at the same time the spring 54 retracts the lock pin 53.

Thus there is provided an article of manufacture in the form of a complete fluid power ensemble adapted to be separably mounted on the headstock of any standard make of machine tool, such as a lathe or the like, and adapted to engage and disengage in a completely automatic manner with a chuck mounted on the spindle of the machine.

While only one embodiment is shown and described, it is to be understood that various changes in design and construction in the present invention disclosure now likely to occur to others may be made without departing from the scope thereof.

Reference should be had to the appended claims to determine the scope of the present invention.

What is claimed is:

1. A chuck jaw closing and opening fluid power unit including a chuck having a body with relatively movable parts, a support formed from the chuck body, a spindle mounted on said support for both endwise and rotatable movement from a non-operative position laterally of said chuck into engagement with means for transmitting rotary movement to a part of the chuck to be actuated, and a combined fluid power drive unit, including a reciprocating motor and a rotary motor each in operative series connection from a source of fluid supply with the said spindle for cooperatively imparting said endwise and rotatable movements to the said spindle.

2. A chuck jaw closing and opening power unit including a support, a spindle mounted on said support for both rotatable and endwise movement from a non-operative position laterally of a chuck into engagement with means for transmitting rotary movement to a part of the chuck to be actuated, and a plurality of fluid responsive power means carried by said support in operative series connection from a source of fluid supply with the said spindle for cooperatively imparting said rotatable and endwise movements to the said spindle, and a series connected fluid actuated lock pin adapted to be projected in cooperation with the said scroll spindle operatively mounted on said bracket adapted to engage with a portion of the machine spindle nose to hold the said spindle and chuck body against rotation during rotation of the chuck scroll by the scroll spindle.

3. A chuck jaw opening and closing fluid power unit for machine tools comprising a bracket formed with fastener openings for mounting on the headstock of the machine, said bracket also serving as a support for the elements of the said power unit, said elements comprising a spindle with a pinion gear for turning a part of a chuck to open or close the jaws thereof, a first motor for imparting axial movement to said spindle and pinion into engagement with the chuck part to be turned, a spring for returning the spindle and pinion to neutral position when the said first motor is deenergized, a second motor for imparting rotation to said spindle and pinion at the same instant the spindle and pinion engage with the chuck part, whereby the power is transmitted to open or close the chuck jaws said first and second motors being connected in series to a source of power.

4. A chuck jaw opening and closing fluid power unit for machine tools comprising a bracket formed with fastener openings for mounting on the headstock of the machine, said bracket also serving as a support for the elements of the said power unit, said elements comprising a spindle with a pinion gear for turning a part of a chuck to open or close the jaws thereof, a first motor for imparting axial movement to said spindle and pinion into engagement with the chuck part to be turned, a spring for returning the spindle and pinion to neutral position when the said first motor is deenergized, a second motor for imparting rotation to said spindle and pinion at the same instant the spindle and pinion engage with the chuck part, whereby the power is transmitted to open or close the chuck jaws, means adapted to lock the body of the chuck against turning operating simultaneously with the said referred to motors, and a spring adapted to unlock said lock means when said motors are neutral.

5. A chuck jaw opening and closing fluid power unit for machine tools comprising a bracket formed with fastener openings for mounting on the headstock of the machine, said bracket also serving as a support for the elements of the said power unit, said elements comprising a spindle with a pinion gear for turning a part of a chuck to open or close the jaws thereof, a fluid motor for imparting forward axial movement to said spindle and pinion into engagement with the chuck part to be turned, a spring for returning the spindle and pinion to neutral position when the said fluid motor is deenergized, a fluid motor for imparting rotation to said spindle and pinion at the same instant the spindle and pinion engage with the chuck part, whereby the power is transmitted to open or close the chuck jaws, means adapted to lock the body of the chuck against turning operating simultaneously with the said referred to motors, and a spring adapted to unlock said lock means when said motors are neutral.

GEORGE A. HIGHBERG.

REFERENCES CITED

The following references are of record in the file of this patent:

UNITED STATES PATENTS

| Number | Name | Date |
|---|---|---|
| 1,713,797 | Whiton | May 21, 1929 |
| 1,816,239 | Van Hamersveld et al. | July 28, 1931 |
| 1,831,225 | Bogart | Nov. 10, 1931 |
| 1,985,586 | Stoner | Dec. 25, 1934 |
| 2,006,913 | Conley | July 2, 1935 |
| 2,180,488 | Van Hamersveld | Nov. 21, 1939 |